(12) United States Patent
Hassan et al.

(10) Patent No.: US 11,956,286 B1
(45) Date of Patent: Apr. 9, 2024

(54) DYNAMICALLY CONTROLLED PARTICIPATION ALLOCATIONS FOR COMMUNICATION SESSIONS

(71) Applicant: MICROSOFT TECHNOLOGY LICENSING, LLC, Redmond, WA (US)

(72) Inventors: Amer Aref Hassan, Kirkland, WA (US); Philip Ibo Ibrahima Drammeh, Kirkland, WA (US); Mahendra Sekaran, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/994,151

(22) Filed: Nov. 25, 2022

(51) Int. Cl.
*H04L 65/1093* (2022.01)
*H04L 65/401* (2022.01)

(52) U.S. Cl.
CPC ...... *H04L 65/1093* (2013.01); *H04L 65/4015* (2013.01)

(58) Field of Classification Search
CPC .................. H04L 65/1093; H04L 65/4015
See application file for complete search history.

(56) References Cited

U.S. PATENT DOCUMENTS

| | | | |
|---|---|---|---|
| 7,007,235 B1 | 2/2006 | Hussein et al. | |
| 9,521,170 B2 | 12/2016 | Bader-natal et al. | |
| 9,913,027 B2 | 3/2018 | Wang et al. | |
| 11,089,163 B2 | 8/2021 | Abraham | |
| 11,336,706 B1 * | 5/2022 | Saito | H04L 65/403 |
| 11,349,679 B1 | 5/2022 | Laird-Mcconnell et al. | |
| 2015/0304366 A1 | 10/2015 | Bader-Natal et al. | |
| 2016/0134668 A1 * | 5/2016 | Shetty | H04M 3/568 |
| | | | 370/260 |

(Continued)

FOREIGN PATENT DOCUMENTS

WO 0128213 A1 4/2001

OTHER PUBLICATIONS

"Managing a Question & Answer Session", Retrieved From: https://freeconferenceusa.com/help/qa_session.html, Retrieved On: Oct. 6, 2022, 5 Pages.

(Continued)

*Primary Examiner* — Dhairya A Patel
(74) *Attorney, Agent, or Firm* — Scott Y. Shigeta; Newport IP, LLC

(57) ABSTRACT

A system provides dynamically controlled participation allocations for communication sessions. A system can create a queue for participants of a communication session, such as an online meeting. The queue can be generated for a communication session having an intended format that allows participants to individually speak in succession, such as a Question and Answer (Q&A) session. The system manages a user interface (UI) of the communication session displaying a timer that changes dynamically for each participant indicating a total time for his or her questions or comments based on an amount of time left for the meeting to end. The system displays, augments, and associates a timer for each participant indicating a total time for his or her questions or comments, which is based on an amount of time left for the meeting to end, number of users providing a "hand raise" input, and history of participation for each participant.

20 Claims, 15 Drawing Sheets

(56) References Cited

U.S. PATENT DOCUMENTS

| | | |
|---|---|---|
| 2016/0255126 A1 | 9/2016 | Sarris |
| 2019/0199759 A1* | 6/2019 | Anderson .............. G06Q 50/20 |
| 2020/0219204 A1* | 7/2020 | Moetteli ................. A47F 10/06 |
| 2020/0219517 A1* | 7/2020 | Wang ..................... G10L 17/18 |
| 2020/0267427 A1* | 8/2020 | Rogers ................. G11B 27/031 |
| 2021/0014074 A1 | 1/2021 | Dhawan et al. |
| 2022/0224554 A1 | 7/2022 | Hassan et al. |
| 2022/0353371 A1* | 11/2022 | Soni ...................... H04M 3/563 |
| 2022/0413794 A1* | 12/2022 | Qiao .................... H04L 65/403 |

OTHER PUBLICATIONS

International Search Report and Written Opinion received for PCT Application No. PCT/US2023/033908, mailed on Jan. 25, 2024, 11 pages.

* cited by examiner

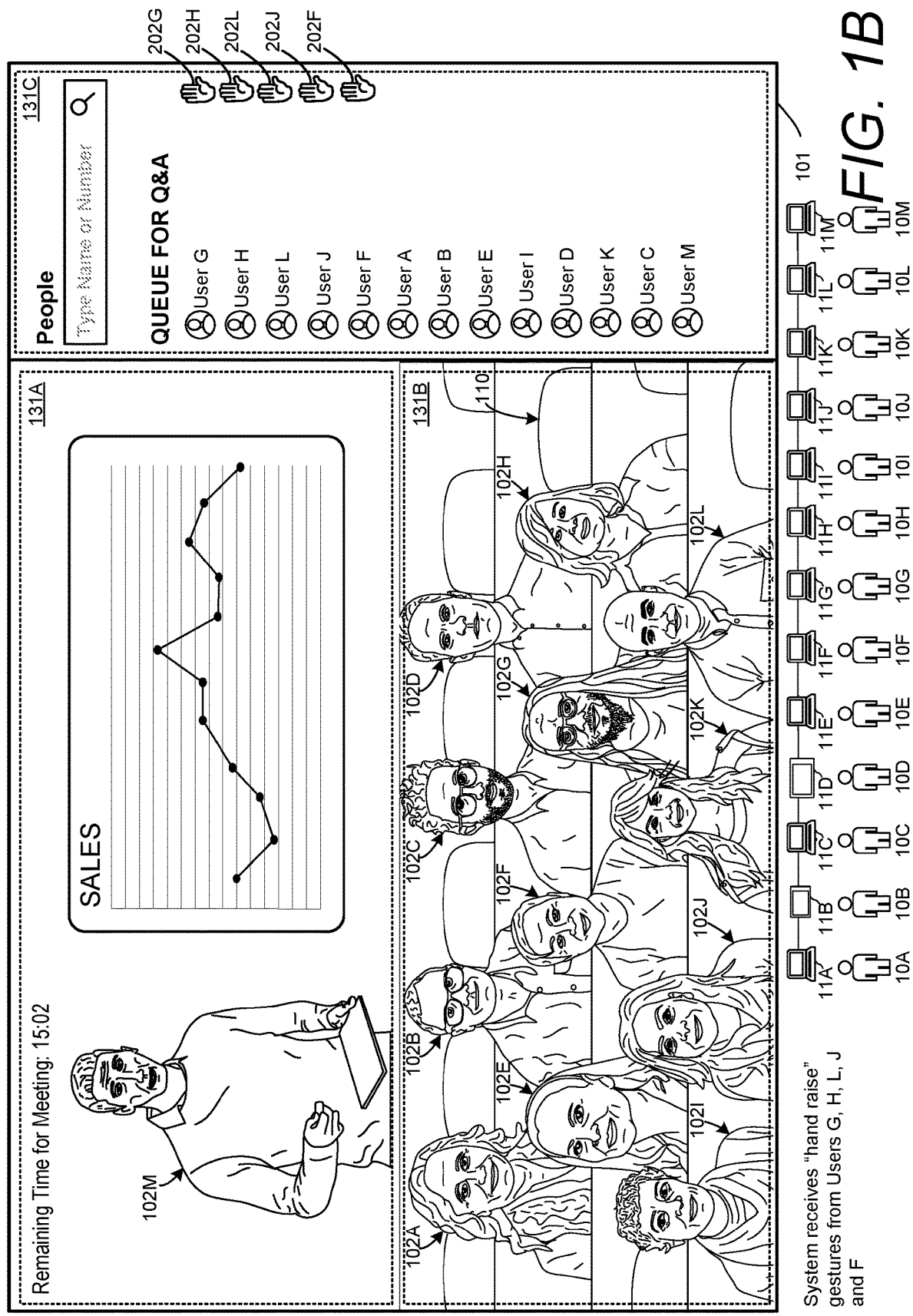

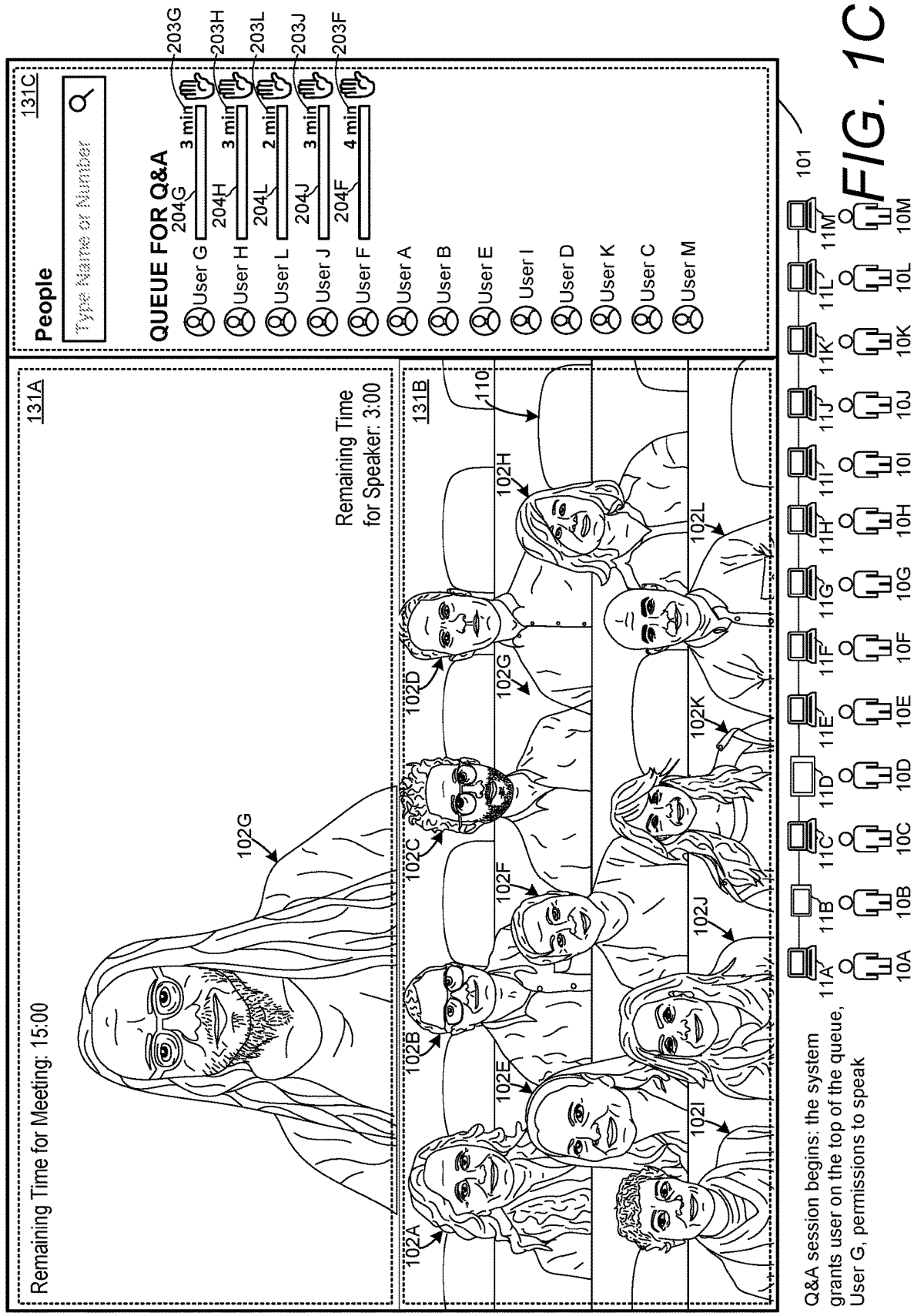

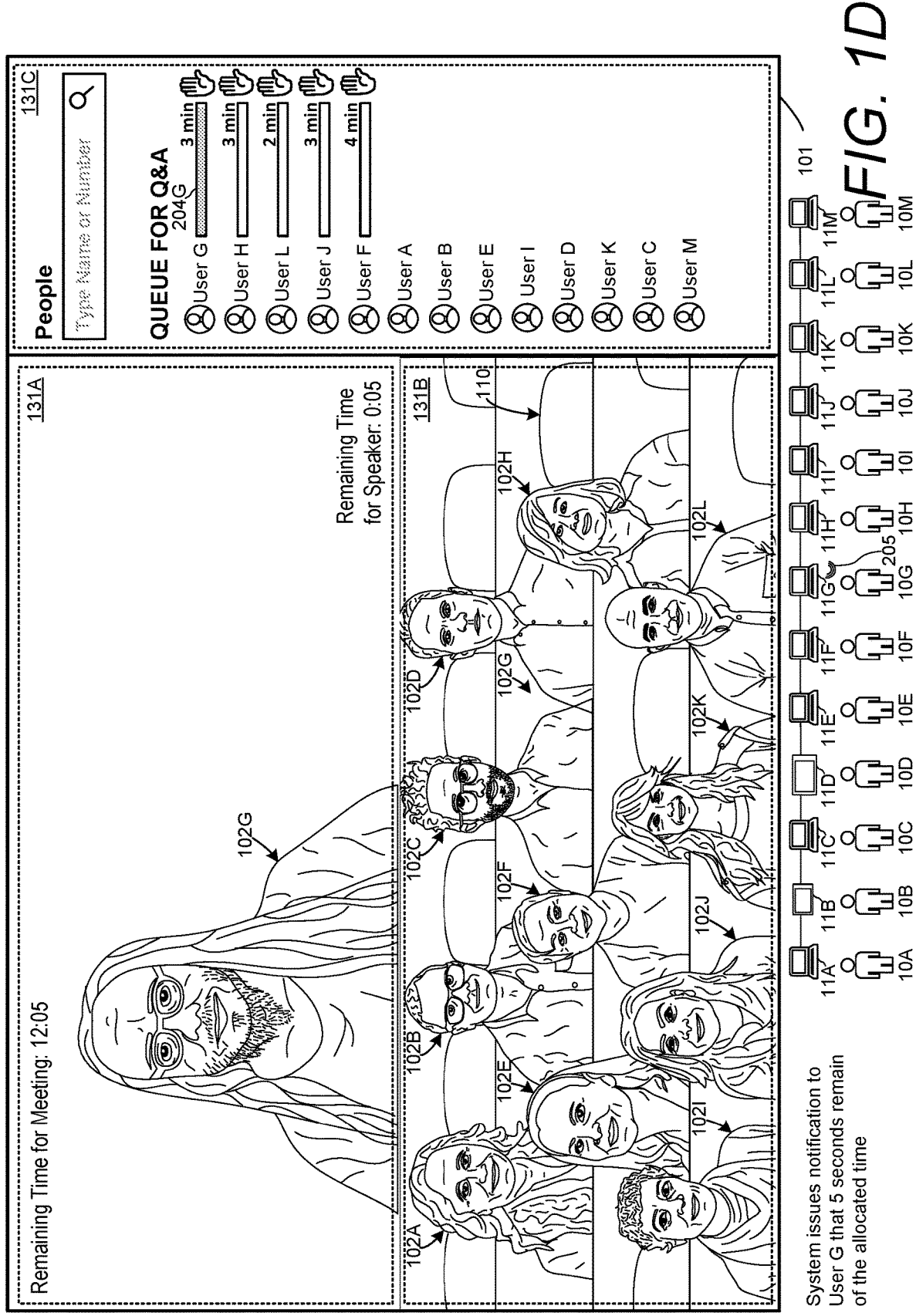

FIG. 1G

DYNAMICALLY CONTROLLED PARTICIPATION ALLOCATIONS FOR COMMUNICATION SESSIONS

BACKGROUND

There are a number of different types of collaborative systems that allow users to communicate. For example, some systems allow people to collaborate by sharing content using video and audio streams, shared files, chat messages, etc. Some systems provide user interface formats that allow users to share content with an audience. Such systems can provide specific sets of permissions that allow users to take specific roles, such as a presenter, audience member, etc.

Although some systems can provide specific sets of permissions for users to take on certain roles, such systems have a number of drawbacks. For instance, when an audience member wishes to become a presenter, each user must perform a number of coordinated actions for such a transition to occur. First, the first presenter may have to relinquish presentation access permissions before allowing a second user to provide a number of manual operations to take on a presenter role. Such an interaction model can be cumbersome and inefficient. These coordinated operations can detract from the features of a communication system and distract users during meeting. Such distractions can cause participants of a meeting to miss salient information. In addition, this process of having some users to provide a number of manual steps to change user permissions during a meeting can lead to unintended permission settings. Someone may make a mistake and grant unintended video content sharing rights, or leave rights in a state beyond an intended time period. Such an arrangement can create a number of attack vectors and expose stored content to a number of security threats.

Existing systems present more complex issues when there are multiple presenters. This can occur when an online meeting involves a Question and Answer (Q&A) session. In some existing systems, when an online meeting involves a Q&A session, the system grants audience members permissions to share audio and video streams to other users. This can create a situation where multiple people are talking at the same time. In some cases, the participants can end up spending lots of time trying to determine the order in which people speak. Some existing systems also create situations in Q&A sessions where dominant speakers tend to use more than their allotted time. That can lead to a situation where a number of participants do not get an opportunity to speak. In any of these scenarios, salient information that was intended to be communicated in a meeting can be missed. This causes a need for users to communicate using other systems and other resources to share information. This can also cause the need for prolonged meetings or cause a need for additional meetings. This can lead to an inefficient user interaction model and lead to inefficient use of computing systems, particularly if users need to use additional resources to communicate missed information. Thus, in addition to having a number of security issues, some current systems can create redundant use of computing resources and a number of inefficiencies with respect to the use of network resources, storage resources, and processing resources.

SUMMARY

The techniques disclosed herein provide dynamically controlled participation allocations for communication sessions. A system can create a queue for participants of a communication session, such as an online meeting, conference call, etc. The queue can be generated for a communication session having an intended format that allows participants to individually speak in succession, such as a Question and Answer (Q&A) session. The queue can be manually created by a meeting organizer, or a queue can be automatically created by the system. Automatic creation of a queue can be invoked when one or more predetermined events occur. For instance, the system can automatically create a queue when a number of meeting participants provide a virtual "hand raise" input during a communication session. The system manages a user interface (UI) of the communication session displaying a timer that changes dynamically for each participant indicating a total time for his or her questions or comments, which is based on an amount of time left for the meeting to end. The system displays, augments, and associates a timer for each participant indicating a total time for his or her questions or comments based on an amount of time left for the meeting to end, number of users providing a "hand raise" input, and history of participation for each participant. In one illustrative example, if 10 people each provide a hand raise input indicating an interest in in taking the floor of a meeting, and there is 30 minutes left in a meeting, the system may allocate each person that provided an input with 3 minutes. If a particular person has a history of speaking in the past, the system may allocate less time, e.g., 2 minutes, for that person. If another person has a history of not speaking enough, the system may allocate more time, e.g., 4 minutes, for that other person.

The system can dynamically update the displayed allocation for each person. Each person's remaining time can be displayed as they progress through their allocated time. If a person finishes early and leaves time extra time for others, that extra time is re-allocated to other speakers in the queue. If a person leaves the queue, their allocated time is re-allocated to other speakers in the queue. The re-allocation can be based on a person's historical activity as described herein.

During a meeting, a system can provide a user interface that includes a primary presenter region configured to display a rendering of a presenter and the presenter's shared content. The user interface can also provide an audience region, which may include a number of individual video streams of audience members arranged in virtual environment or in a grid arrangement. When the system determines that individual audience members raise their hand, the system generates a data structure defining a queue. The system also automatically adds the individual audience members to the queue. As the first presenter progresses through their presentation, question, or comments, the system can automatically update a timer to show how much is remaining for the first presenter.

The system can control permissions for each participant based on their respective allocated timeslots. For example, during the first presenter's allocated time, the system can automatically change their permissions to allow them to present content on remote computers of other users, and broadcast audio and video signals to remote computers of other users. When that first person's time is up, without the need of a human input to change permissions, the system can restrict those permissions so that first presenter can no longer share content, audio or video to the remote computers of other users.

The techniques disclosed herein can provide a number of technical effects including enhancing the security of a communication system. By automating the assignment of specific permissions according to role transitions, a system can enhance security by mitigating the need for users to perform manual steps to change permissions during an event. Automatically assigned permissions that are based on allocated times can reduce the need for a manual input for changing permissions and thereby reduce introduction of human error. Such an arrangement can reduce the number of attack vectors and exposure to a number of security threats.

In addition to improving the security of a system, the techniques disclosed herein can provide a number of efficiencies. By providing an updated timer for each presenter, users can adjust the level of detail of their presentation and focus on salient points based on the display of a more accurate timer. When information is organized more accurately and with fewer manual inputs, a user is less likely to miss salient information during an event. Such benefits can increase the efficiency of a computing system by reducing the number of times a user needs to interact with a computing device to obtain information, e.g., prolonging meetings, retrieving meeting recordings, requesting duplicate copies of previously shared content, etc. Thus, various computing resources such as network resources, memory resources, and processing resources can be reduced.

The techniques disclosed herein also provide a system with a granular level of control when aligning permissions to specific roles of an event. Such features can also lead to a more desirable user experience. In particular, by automatically controlling user interface transitions and managing permissions, a system can reduce the number of times a user needs to interact with a computing device to control the format of a presentation and to update security permissions. This can lead to the reduction of manual data entry that needs to be performed by a user. By reducing the need for manual entry, inadvertent inputs and human error can be reduced. This can ultimately lead to a reduction in undesirable permissions and more efficient use of computing resources such as memory usage, network usage, processing resources, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1B is an example of a user interface including a queue of presenters of a communication session, where the queue is presented in response to users providing hand raise inputs.

FIG. 1C is an example of a user interface showing a queue of presenters and allocated times for each presenter.

FIG. 1D is an example of a user interface showing a timer of a first presenter in a queue of presenters.

FIG. 1G is an example of a user interface showing how the second presenter quits before the end of her allocated time, leaving a remaining time for the second presenter.

DETAILED DESCRIPTION

The techniques disclosed herein can provide a number of technical effects including enhancing the security of a communication system. By providing automated transitions between presenters of a communication session and by displaying an updated timer for each presenter, a computing device can effectively display information to assist users in conveying information based on a remaining time. By providing an updated timer for each presenter, users can adjust the level of detail of their presentation or focus on salient points based on the display of a more accurate timer. When information is organized more accurately and with fewer manual inputs, a user is less likely to miss salient information during an event.

Also, by automating the assignment of specific permissions according to transitions between different presenters who are each allocated a specific timeslot, a system can enhance security by mitigating the need for users to perform manual steps to change permissions during an event. Automatically assigned permissions that are based on transitions between different presenters who are each allocated a specific timeslot can reduce the need for a manual input for changing permissions and thereby reduce introduction of human error compared to systems where manual entry is used for changing permissions. Such an arrangement can reduce the number of attack vectors and exposure to a number of security threats.

The techniques disclosed herein also enable a system to provide an accurate display of remaining time for each presenter in a queue. Such features can also lead to a more desirable user experience. In particular, by providing an accurate display of remaining time for each presenter, a system can reduce the number of times a user needs to interact with a computing device as each presenter can focus on more salient points and communicate more efficiently since they are not cut off without proper notification of a remaining time and notification of any time extensions. This elevated accuracy of communication can lead to the reduction of manual data entry that needs to be performed by a user. By reducing the need for manual entry, inadvertent inputs and human error can be reduced. This can ultimately lead to a reduction in undesirable permissions and more efficient use of computing resources such as memory usage, network usage, processing resources, etc.

These benefits can also reduce the likelihood of inadvertent user inputs and other errors that may result when a user has to review recordings or communicate with others when salient information is missed due to a lack of user engagement. When a participant of a video conference misses salient information due to a lack of user engagement, a system may be required to retrieve, communicate, and process multiple copies of information.

Figure 1A:
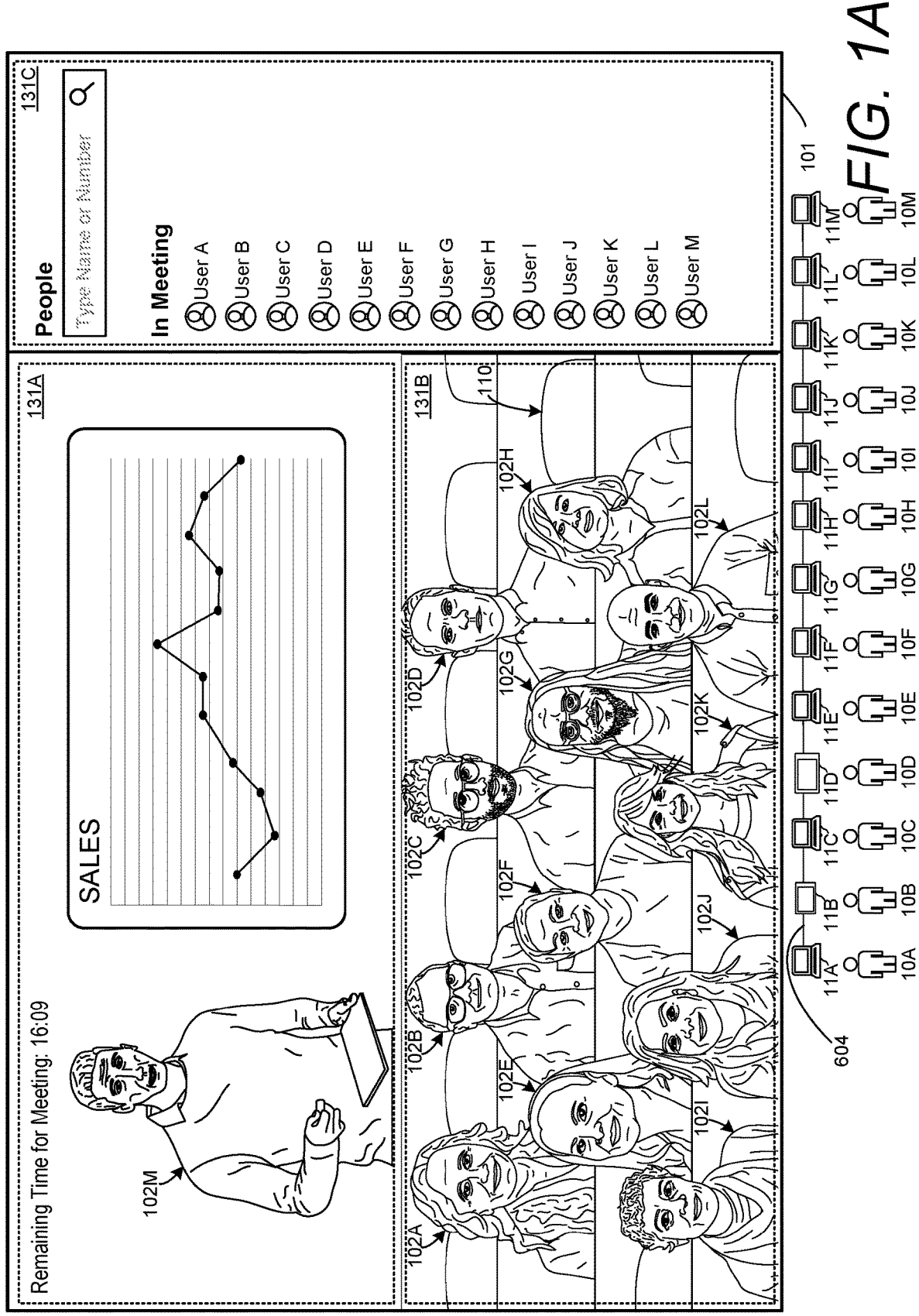
FIG. 1A is a block diagram of a system and an example user interface for providing automated a user interface for presenters of a communication session.

Referring now to FIG. 1A, aspects of a user interface 101 having a primary presentation area 131A, an attendee image region 131B, and an attendee status region 131C. The primary presentation region 131A can include a display of presentation content 103 and a rendering of a presenter, which in this example shows a rendering of a presenter 102M of User 10M. The attendee image region 131B, also referred to herein as the Together Mode region 131B, can include individual renderings 102A-102L of the video streams of a plurality of participants 10A-10L individually communicating from remote devices 11A-11L. The attendee status region 131C can indicate a status of each participant 10A-10L, e.g., that they are "In Meeting," "invited," etc.

As shown, the individual renderings 102A-102L of the attendee image region 131B each has a position relative to a seating configuration of a virtual environment 110. This example is provided for illustrative purposes, as the virtual environment 110 can be in any form, such as an office, meeting room, auditorium, stadium, etc. The user interface shown in FIG. 1A can be generated for display at any one of the devices and can display any number of participants.

In some configurations, the Together Mode region 131B provides the same view for each person in a meeting and the seating arrangement for the participants does not change over time. More specifically, the arrangement of the user renderings, e.g., the order and spacing between the renderings, are the same across each device. This is unlike some traditional grid views that show participants' videos in different locations on each person's screen and that move the boxes around during the call based on who's speaking or who joins or leaves a meeting. Since an area of the brain is devoted to spatial memory, Together Mode's consistency provides a number of benefits to reduce the cognitive load and fatigue to each user of a video conference.

Together Mode involves a user interface arrangement that gives participants of a communication session a feeling that they are in the same room. In general, when an application enables Together Mode, the application generates a user interface that arranges the participants of a communication session in one shared space. In some configurations, images of each participant can be arranged according to a seating arrangement of a virtual environment. This user interface arrangement enables each participant to feel more connected to the other participants. This user interface arrangement can be used for meetings, coffee breaks, corporate all-hands meetings, sporting events, or any other type of get together.

In some configurations, the individual renderings 102 of each participant 10 are generated using a conforming crop filter that removes any component of an image that includes a background from a participant's surrounding environment. Each video stream generated by a camera at a participant's device 11 is received and processed to produce a rendering 102 that is shaped according to the image of the user and any accessories that the user may be wearing, such as a hat, jewelry, etc. Thus, when the shaped image of the participant is positioned over an image of a virtual environment, the system can give the appearance that the participant is in the virtual environment with other participants of a communication session. These shaped renderings 102 allow viewers to focus on the depicted person without the distraction of an image of their physical surroundings.

The size of each rendering 102 of the participants may also be normalized to give the appearance that the participants are in the same room. In some examples, the renderings 102 can be resized or scaled within a threshold size difference of one another, or the renderings 102 can be resized or scaled according to predetermined dimensions suited for a particular virtual environment. For a group meeting, for example, each rendering of each participant can be scaled to fit depicted seats, desks, etc. These adjustments enable a system to give the appearance that each person is sitting together within a given setting, e.g., an office, meeting room, stadium, etc. These features are an advancement over the traditional user interface arrangements that only have a grid of boxes. The Together Mode features help create an environment that has a profound impact on the feel of a video conference.

In some embodiments, the system 100 can further the technical benefits and increase security efficiency of a system by controlling permissions to video streams, audio streams and shared content during transitions between presenters listed in an ordered queue. The system can also generate a queue based on the detection of a predetermined event and populate that queue with users who intend to provide a presentation. In some configurations, the predetermined event may include an event where a threshold number of people provide a "hand raise" input. This can include an input where a user selects a hand raise input based on a selection of a menu control on their respective computer, or a user can actually perform an action of raising their hand and their respective computer can detect that gesture using a camera and/or other sensors. A threshold number of participants can be one participant or any other number of participants.

FIG. 1B shows a set of users, e.g., Users 10G, 10H, 10L, 10J, 10F, providing "hand raise" inputs, which causes the system to place these users in a queue. As described in more detail below, each hand raise input can define a request for a state change for each user, e.g., a state change that grants permissions to become a presenter.

A system can receive one or more inputs associated with individual participants 10G, 10H, 10L, 10J, 10F of the communication session. The one or more inputs causes the system to order the identifiers of each of the participants 10G, 10H, 10L, 10J, 10F in a queue. The order can be based on a first-in-line order, e.g., User 10G provided their input first, User 10H provided their input second, etc. The order can also be based on historical data. For example, if User G has not had many opportunities to speak in past meetings, e.g., User G has 1 minute of prior speaking time, which is less than speaking time of User H, then User G would be placed before User H in the queue.

As described in more detail below, the individual inputs of the one or more inputs correspond to each of the individual participants requesting initiation of an operational state change from a first class of operations to a second class of operations. For instance, a hand raise input provided by User 10G is a request for the system to grant User G permission to speak to the other users via live video and audio streams and by sharing content. A first class of operations can restrict User G from sharing audio and video streams, and a second class of operations can permit User G to share audio and video streams. The time allocations for each user can trigger the operational state changes from a first class of operations to a second class of operations at the start of an allocated time, e.g., when a person is allowed to present to the main stage and/or broadcast an audio signal. The time allocations for each user can trigger the operational state changes from the second class of operations to the first class of operations when the person is done presenting or when their allocation runs out. A system can detect when a person is done presenting when they stop speaking for a predetermined time, when they stop speaking for a predetermined time and they are past their allocated time, when they stop sharing a video stream, when they stop sharing a broadcasted audio stream, etc. The system can determine that a person is done presenting when they have a volume input that is below a threshold for a period of time, or when the system detects that they have stopped speaking, e.g., image analysis determines that they are not making facial gesture that indicate they are talking.

As the "hand raise" inputs are received, the system continually calculates individual time allocations for each of the participants 10G, 10H, 10L, 10J, 10F in the queue, wherein the individual time allocations are each based on a number of the participants in the queue and a remaining time of the communication session. For example, when the User 10G and User 10H provide an input when there is 15 minutes left in a meeting, each person would be allocated 7.5 minutes to speak. However, in this example shown in FIG. 1C, 5 users provided an input with 15 minutes left in the meeting. Thus, each user is allocated 3 minutes to speak. The remaining time can be based on a meeting "end time" on a calendar event for the meeting.

Also, in this example, the system detects some exceptions to the allocated times. Specifically, as shown in the example data set of FIG. 2, the system determines that User L has had a history where they spoke more than a threshold amount of time in prior meetings. Thus, as shown in FIG. 1C, User L is allocated less than the 3 minute average. In this example, User L is allocated less than the divided time of three minutes since User L has talked in prior meetings more than the other users. User L can also be allocated less time, e.g., two minutes, or more time, e.g., 4 minutes, based on their level in an organization, etc. Higher level people, such as CEO, may get an upward deviation in time from the average versus a standard employee. One example is shown in FIG. 1C, where User F has more time since they are at a level that is above a threshold level.

Figure 2:
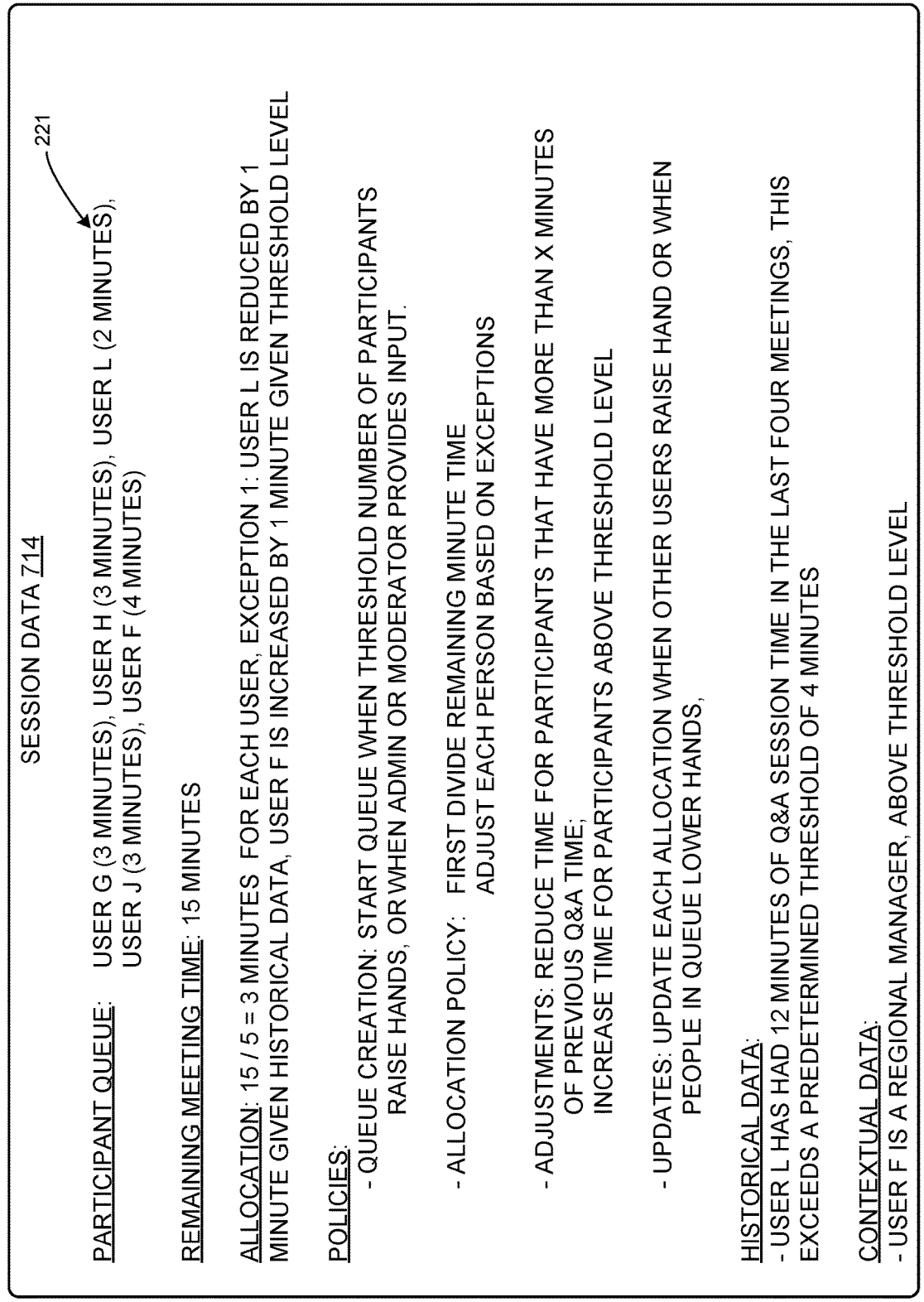
FIG. 2 is an example of a data structure that defines an order of speakers of a queue, each speaker's allocated time, and other policy data that enable a system to dynamically update a timer based on user activity.

Once the inputs have been received, and the time allocations are determined, the system updates the session data 714, as shown in FIG. 2. The system can react to the inputs and in response to the one or more inputs associated with individual participants 10G, 10H, 10L, 10J, 10F, the system can configure the session data 714 to define the order of the identifiers of each of the participants 10G, 10H, 10L, 10J, 10F in the queue 221, e.g., a speaking order. The session data can also further define the individual time allocations for each of the participants 10G, 10H, 10L, 10J, 10F in the queue. These allocations can be based on the policies defined in the session data and the contextual data defining a status of a user and user activity.

Also shown in FIG. 1C in conjunction with FIG. 2, the system can cause a display of a user interface 101 comprising the individual time allocations 203 for each of the participants 10G, 10H, 10L, 10J, 10F in the queue 221, wherein the individual time allocations are displayed in association with respective identifiers or representative images of each of the participants in the queue. The user interface 101 can also include a progress bar 204 for each of the participants in the queue. FIG. 1C shows a state of the communication session where there is 15 minutes remaining the in meeting, and the first presenter has just started their 3-minute allocation. In some configurations, at the start of their allocated time, the system can allow a presenter to sharing their live video stream, audio stream, and/or a display of their shared content. This can be done automatically based on the remaining time in a meeting and based on the allocation defined in the session data.

The system can control the progress bar to graphically display the amount of time that is used by each participant. For instance, as shown in FIG. 1D, when the first presenter, User 10G, has used 2:55 minutes of his allotted time, the progress bar is shaded to show that user's progress. Also shown in FIG. 1D, the system can also generate an alarm or other notification when a user is at a predetermined time relative to the end of their allocated 3-minute timeslot. In this example, the system causes the generation of an audible alarm 205 at the client computing device 11G associated with User 10G when the system detects that the user has five seconds remaining in his allocated timeslot.

In some configurations, the system can restrict a presenter from sharing their live video stream, audio stream, and/or a display of their shared content at the end of their allocated time. Thus, in this example, when the timer for the first presenter, User 10G, reaches zero minutes remaining, the system can mute that user, remove their video from the main stage, and/or remove the display of any content they are sharing on the devices of other participants, e.g., User 10A-10F, and 10H-10M.

Figure 1E:
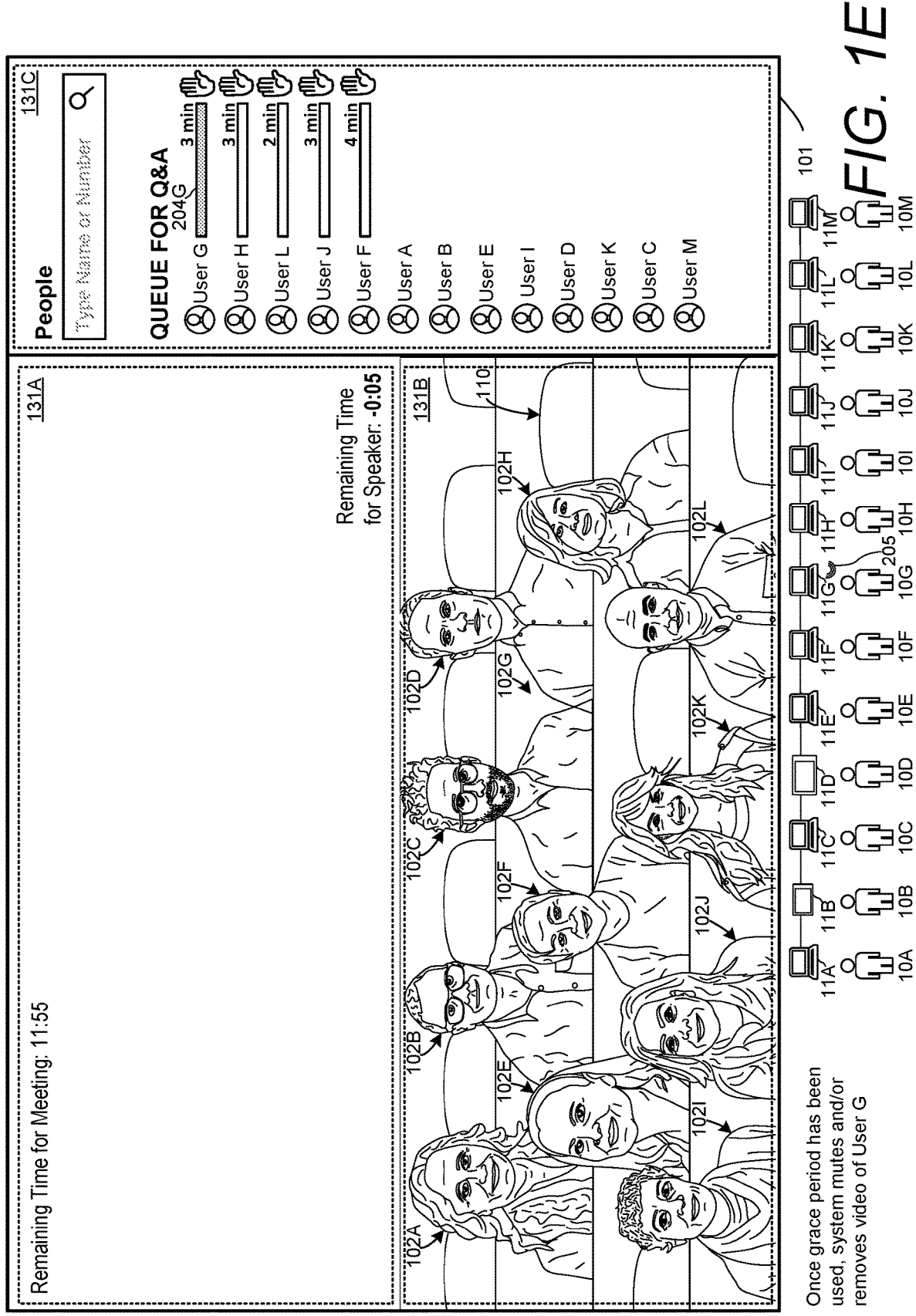
FIG. 1E is an example of a user interface showing how a first presenter in a queue of presenters can be removed from a presentation stage when they have run over an allocated time.

In some configurations, the system can allow a presenter to have a grace period. This can occur as a default setting or when an administrator having appropriate permissions allows the grace period. For example, if User B is designated as an administrator for this communication session, the system can issue a notification, e.g., a visual indicator and/or a sound, on the computer 11B of User 10B, at a predetermined time before the end of the first presentation by User 10G. Based on an input provided by User 10B, the system can allow User 10G to extend their time or deny an extension. If an extension is not issued, one or more of the sharing permission of User 10G will be restricted at the end of User 10G's allocated time. If an extension is issued, one or more of the sharing permission of User 10G will be restricted after a predetermined grace period has elapsed. For instance, as shown in FIG. 1E, the user interface can remove the first presenter from the main stage after a predetermined grace period of 5 seconds has elapsed. At that time, the system can place the live stream of the presenter, User 10G, in the attendee image region 131B.

Figure 1F:
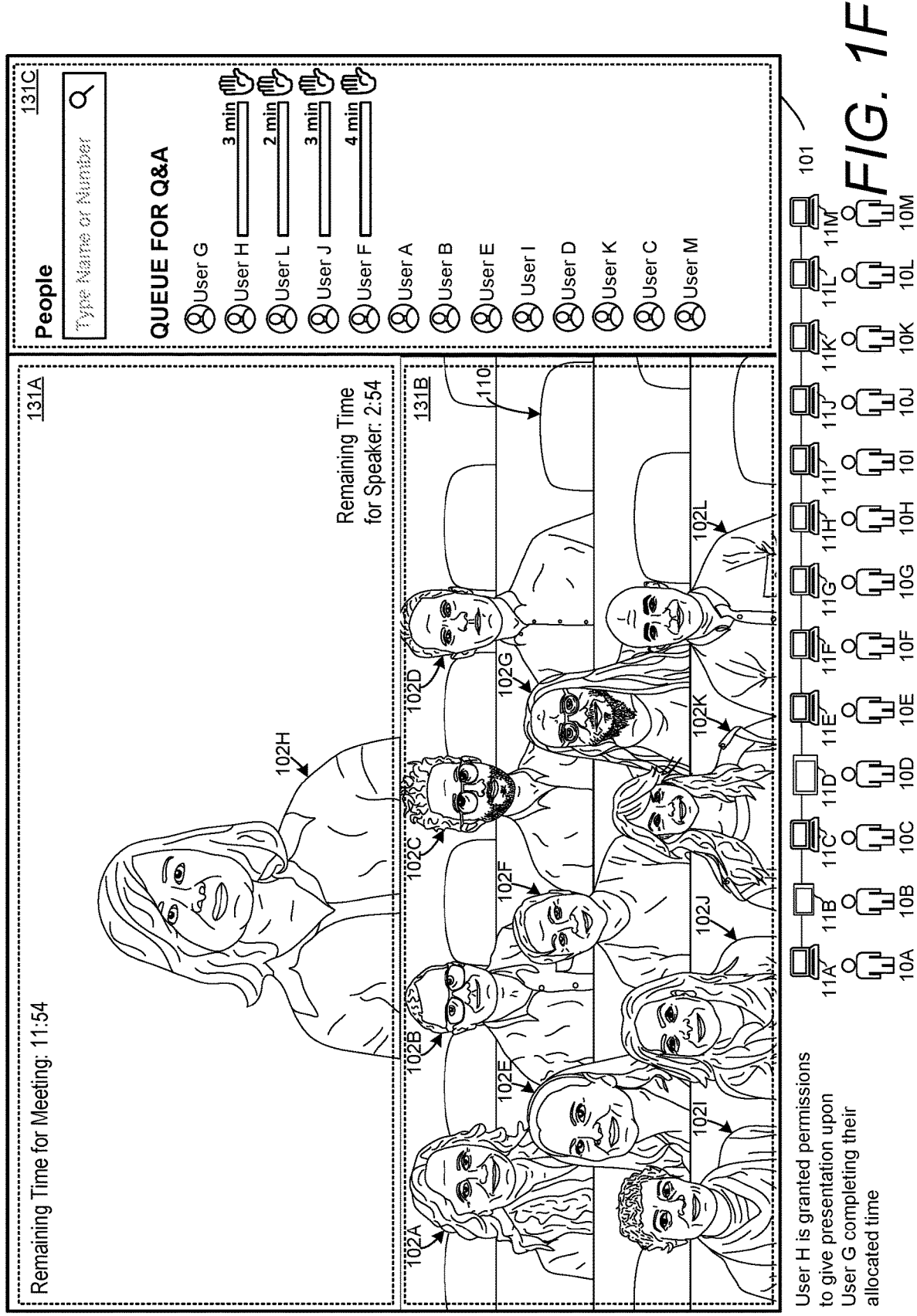
FIG. 1F is an example of a user interface showing how a second presenter in a queue of presenters can be automatically displayed once the first user is removed from the stage by the system.

FIG. 1F shows the user interface 101 at a state of the communication session where a rendering 102H of the next presenter, User 10H, is displayed in the main stage during her allocated time of 3 minutes. The UI shows that the state of the communication session is at a point where there is 11:54 minutes left in the meeting and User 10H has 2:54 minutes left in her allocated timeslot. When the system automatically removed the permissions of User 10G to share content, the system automatically permits User 10H to display content and a rendering 102H of a live video stream of User 10H at start of the allocated time for User 10H. The extension permitted by the administrator or the moderator can cause an extension of the meeting. Thus, User 10H can start with 12:00 minute remaining in the meeting and 3 minutes remaining for her allocation.

Figure 1G:
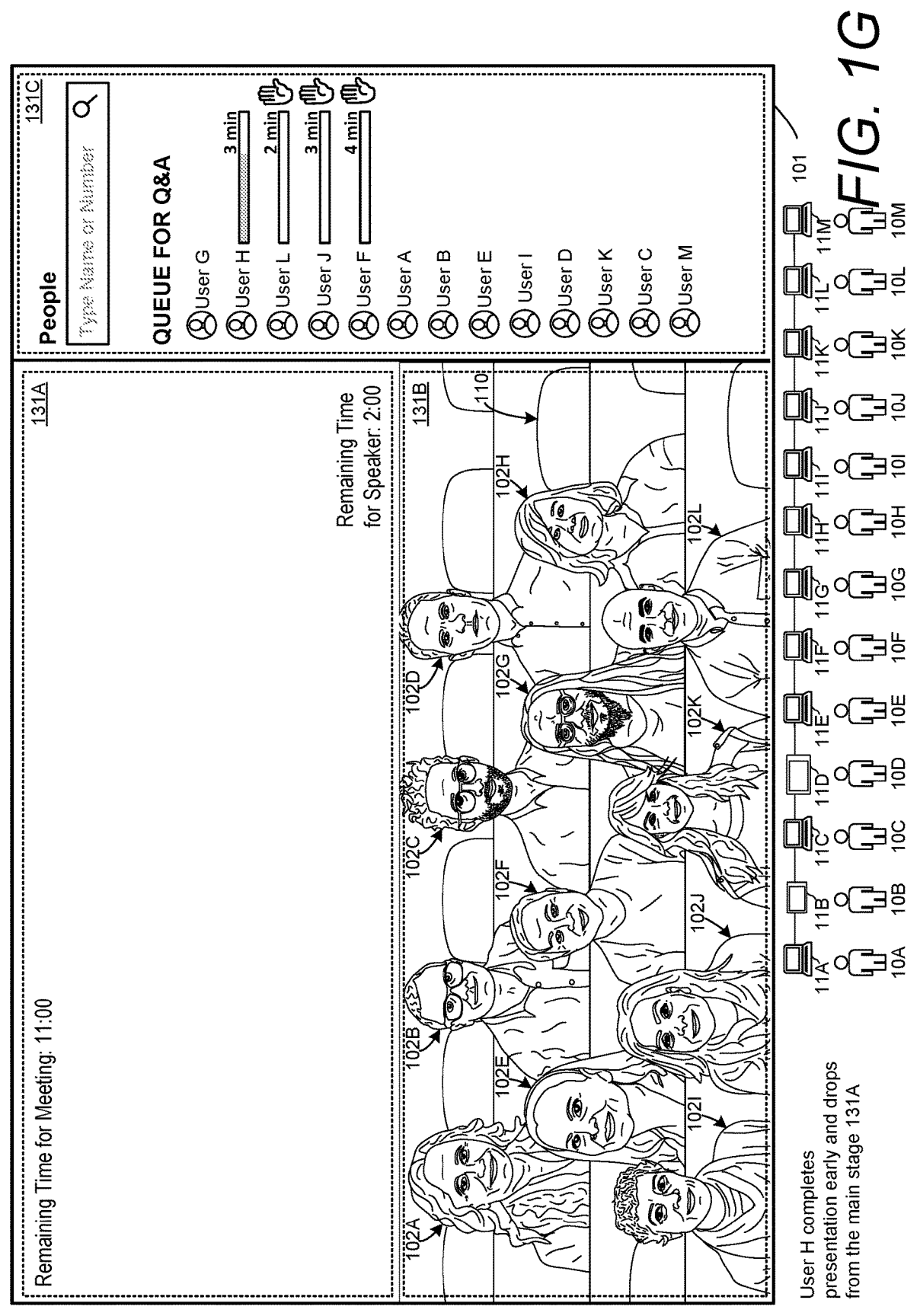

FIG. 1G is an example of a user interface showing the state of the communication session is at a point where there is 11:00 minutes left in the meeting and User 10H has 2:00 minutes left in her allocated timeslot. However, for illustrative purposes, User 10H has finished early and she has stopped sharing her audio and video stream to the main stage of other computers. In response to determining that a user, such as User 10H, has stopped sharing either their video stream or audio stream before the end of their allocated timeslot, the system can calculate how much time is left for that person's time slot. In this case, User 10H has stop sharing their video stream two minutes before the end of their timeslot. The system can then divide that time among the remaining presenters.

Figure 1H:
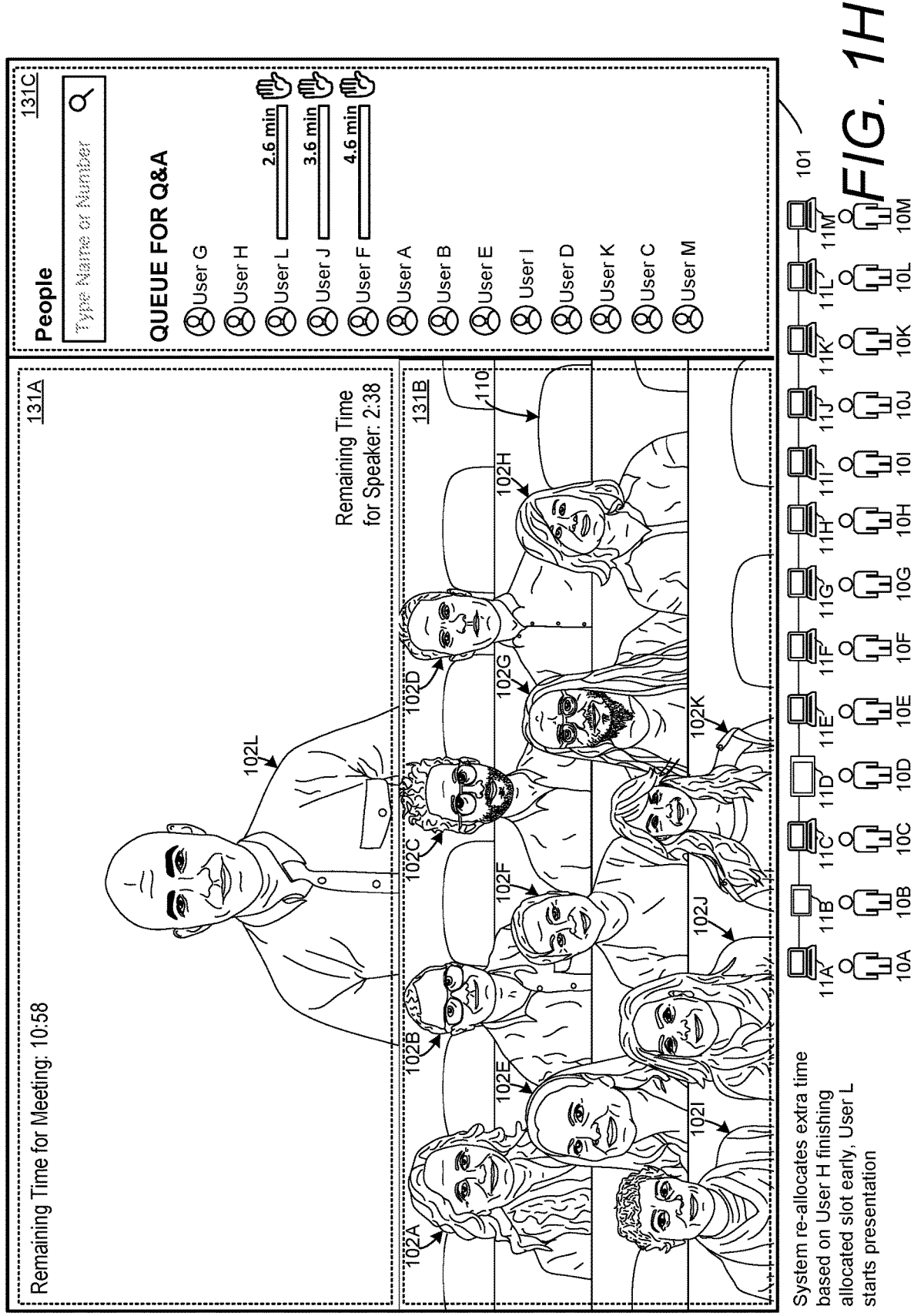
FIG. 1H is an example of a user interface showing how the remaining presenters are allocated a division of the remaining time for the second presenter.

FIG. 1H is an example of a user interface showing how the remaining presenters are allocated a division of the remaining time for the second presenter, User 10H. As shown, the two minutes is divided and allocated to the other presenters. Each of the remaining presenters obtains an additional 0.6 minutes. The division can be equal or the division can be based on weighted factors, such as the historical data described herein. If a user, such as User L, has a history of talking in meetings more than others in the meeting, or has talked more than a threshold period of time, the allocation of the time acquired from another presenter may be less for User L, versus allocations to other presenters, such as User 10J or User 10F. The allocation of divided time may also increase for a particular user if that user has not talked more than others or has not talked more than a threshold period of time in past meetings. For example, User 10L may gain 0.5 minutes in this re-allocation of the time for User 10H, while User 10F may gain 0.6 minutes.

Figure 1I:
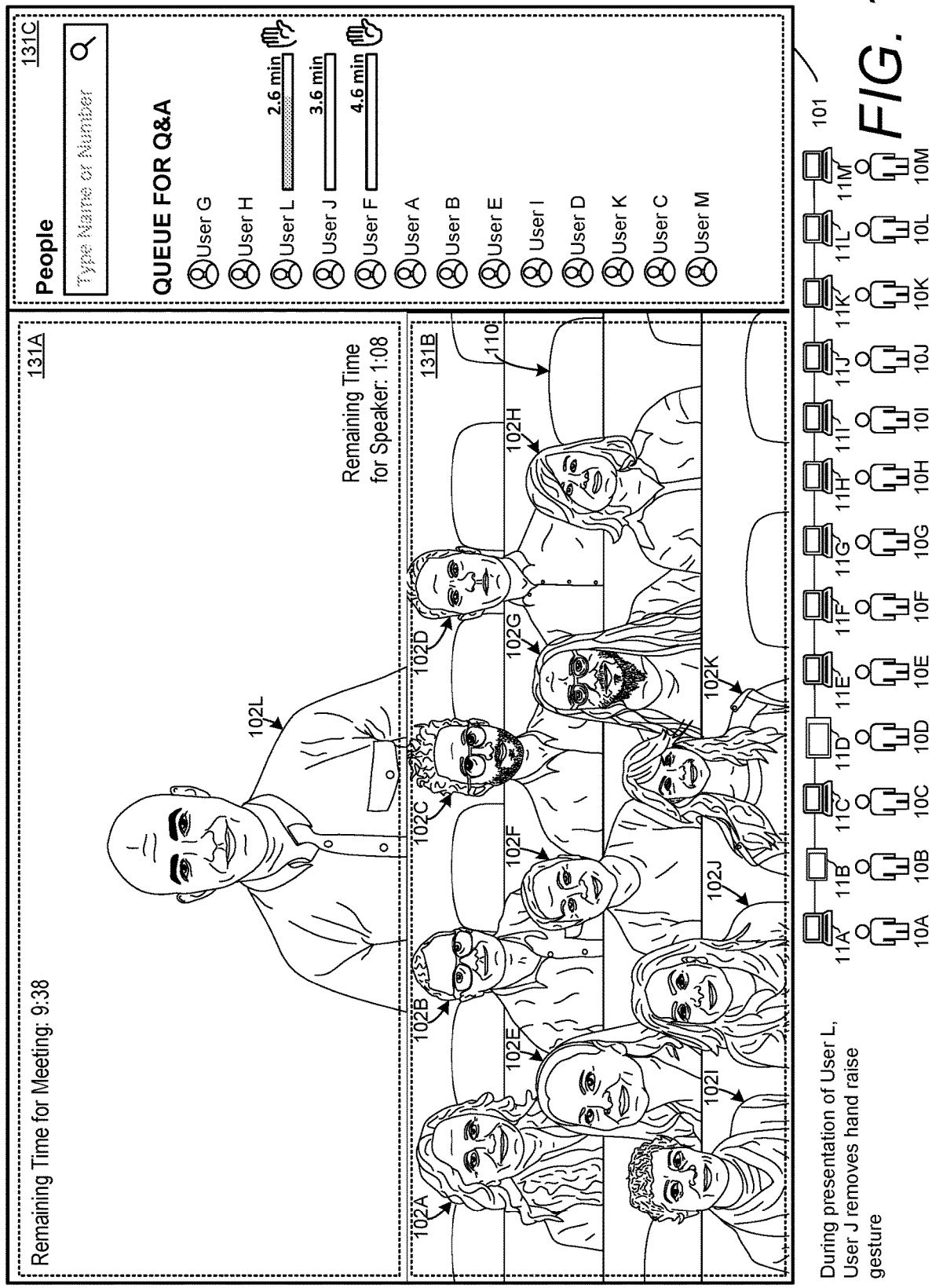
FIG. 1I is an example of a user interface showing a scenario where another user drops from the queue before the start of their presentation.
Figure 1J:
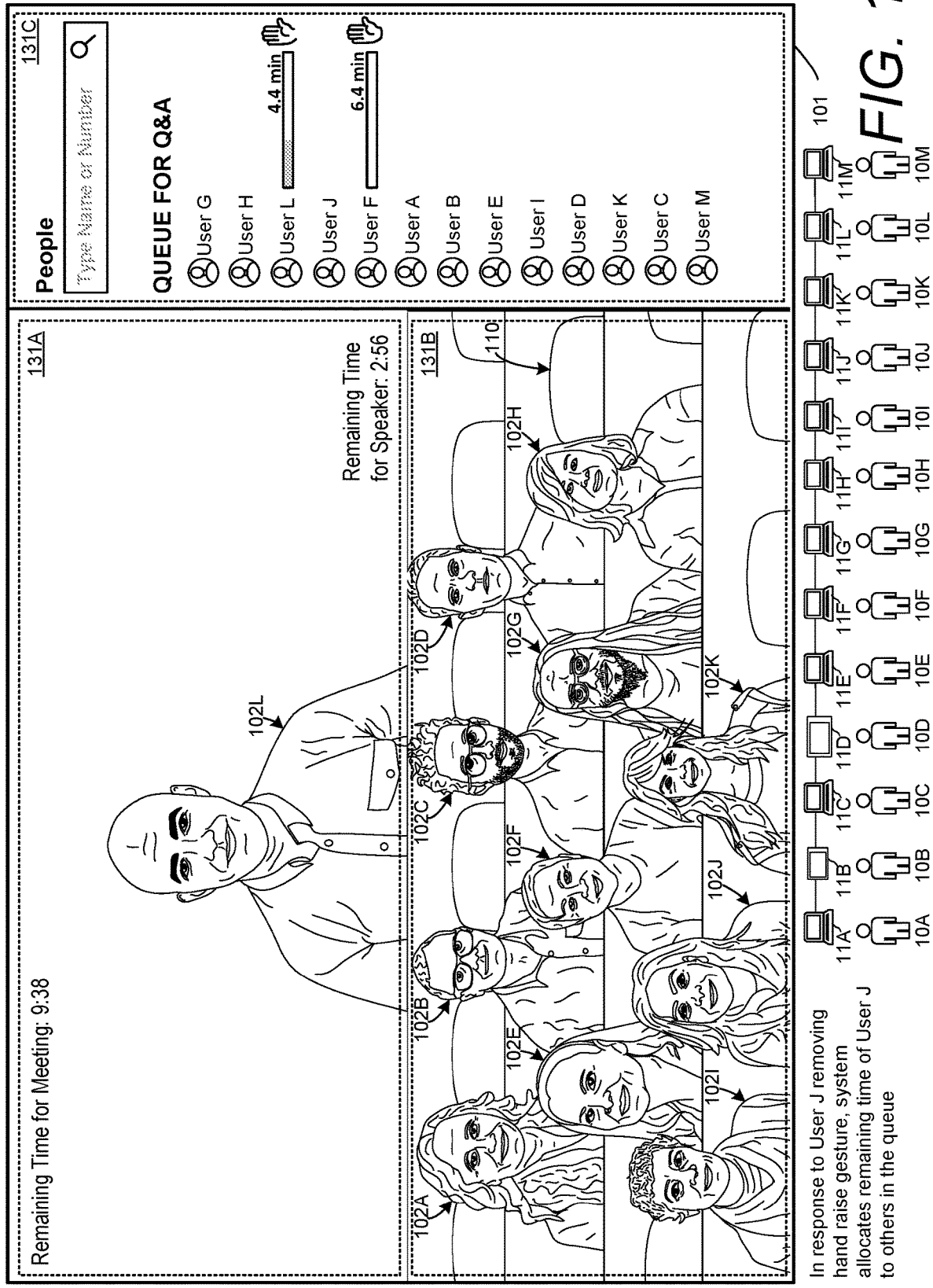
FIG. 1J is an example of a user interface showing how the remaining presenters are allocated a division of the remaining time for another user who drops from the queue before the start of their presentation.
Figure 1K:
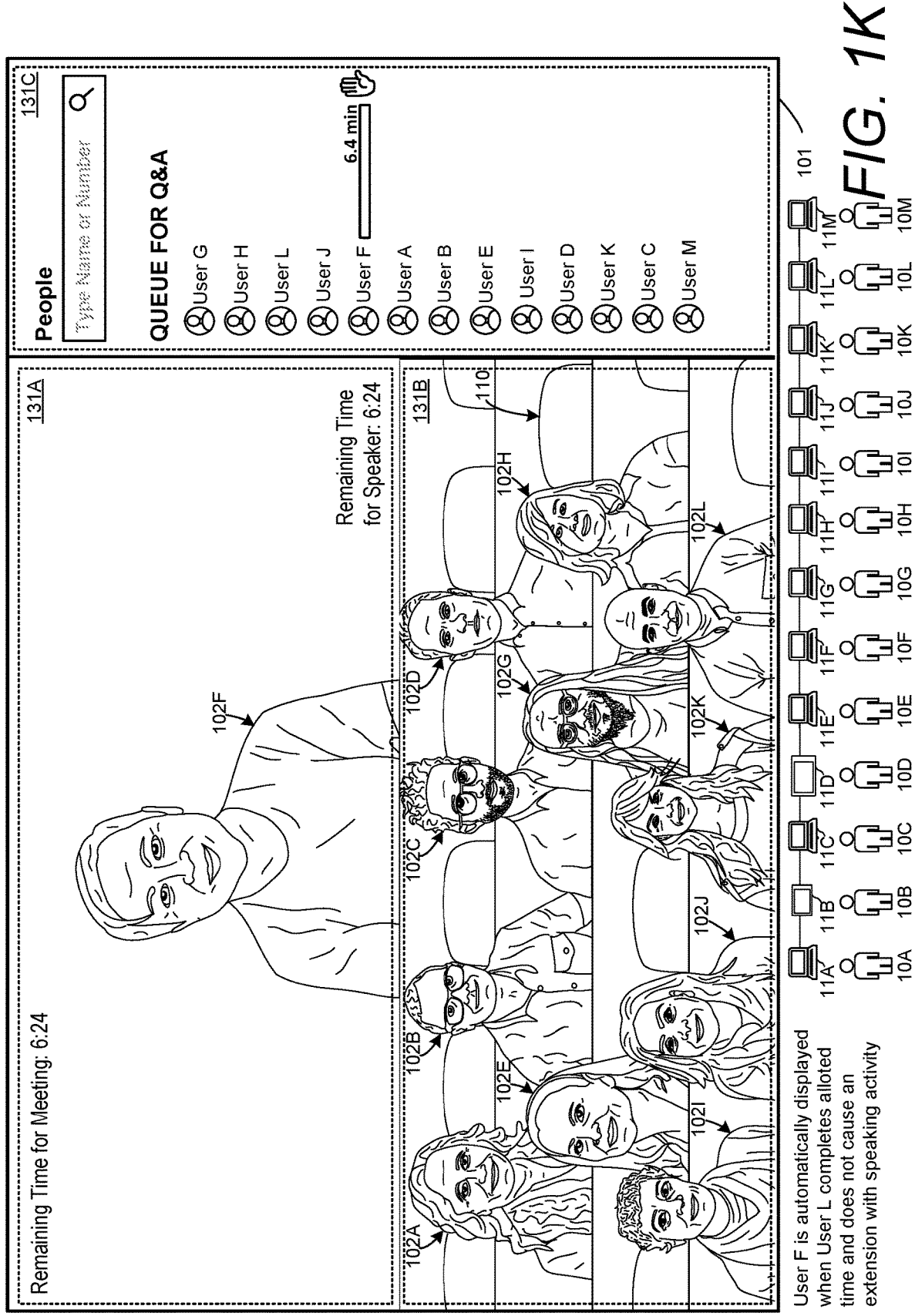
FIG. 1K illustrates a user interface at a state of the communication session for a particular user has an updated remaining time for that user's allocated time slot.

FIG. 1H also shows that the state of the communication session is at a point where there is 10:58 minutes left in the meeting and User 10L has 2:38 minutes left in his allocated timeslot. FIG. 1I shows that the state of the communication session is at a point where there is 9:38 minutes left in the meeting and User 10L has 1:08 minutes left in his allocated timeslot. For illustrative purposes, at this time, User J has lowered their hand raise, e.g., cancelled their request to be presented on the main stage. In response to detecting such an event, the system can then divide the time of User J among the remaining presenters. The allocation of the time for User J can be equally divided between the remaining presenters or the allocation of the time for User J can be weighted as described above. FIG. 1J shows an example of how the allocation of the time for User J is divided and added to the time of User L and User F. This time can be added while a presenter is in progress, as shown with respect to User 10L. The rendering 102L of User 10L will be displayed during the duration of this new allocated time shown in FIG. 1J. FIG. 1K shows that the state of the communication session is at a point where there is 6:24 minutes left in the meeting and User 10F has 6:24 minutes left in his allocated timeslot.

FIG. 2 shows an example of session data 714 that can be used to control aspects of each meeting, e.g., each communication session. The session data can define the queue 221, which shows order in which each participant is to be presented on the main stage. The session data can also define the allocated times for each participant who has provided a hand raise input. The session data can also keep track of the remaining time of a meeting and define policies for allocating time for each person. The session data can also define criteria that the system can use to create a queue. For instance, a queue can be generated when a threshold number of people, e.g., one person, provided a hand raise input. Other policies can define how remaining time, or re-captured time (when a User drops their hand raise or finishes a presentation early) can be re-allocated to other presenters. These policies can be based on historical data or contextual data showing a person's rank or title, which may allow the system to allocate more time for people having a threshold rank/title, or less time for people who do not have a threshold rank/title.

The session data can be updated to show the remaining time for each person. As the system transitions between each state, e.g., as the current time of a meeting transitions from the allocated time of one user to the allocated time of another user, the system can transition the permissions allowing a broadcast of audio and video streams to the main stage from the one user to the other user. This automation allows the system to change the permissions without human input. This can improve the security of a system, which can expose content or streams if permissions are prone to human error.

In some configurations, the hand raise input can be a request to share content. The content can include live video data, recordings, file data, or any other content and other media forms. The input can include an input from a keyboard, camera, or any other sensor of a computing device. For instance, the input can be a keyboard input, a touch pad input, or a video input defining a specific gesture can indicate that a user desires to share information with others and transition the system to operate in a presentation mode. In some configurations, the input can be generated by receiving video data defining a predetermined gesture performed by the user. This can include a camera on the computing device of a requesting user, such as computer 11B of User 10B. In some configurations, the system can generate an input when video data of the device defines a predetermined gesture performed by the user. The predetermined gesture can include a movement of a hand of the user in an upward direction. The predetermined gesture can also include a movement of a hand of the user in an upward direction, wherein the predetermined gesture comprises a movement of a hand of the user being raised a predetermined height. A person can remove that request by lowering their hand or by providing a voice input, such as "remove me from the queue" or the input can be a second keyboard input or touch pad input.

Figure 3:
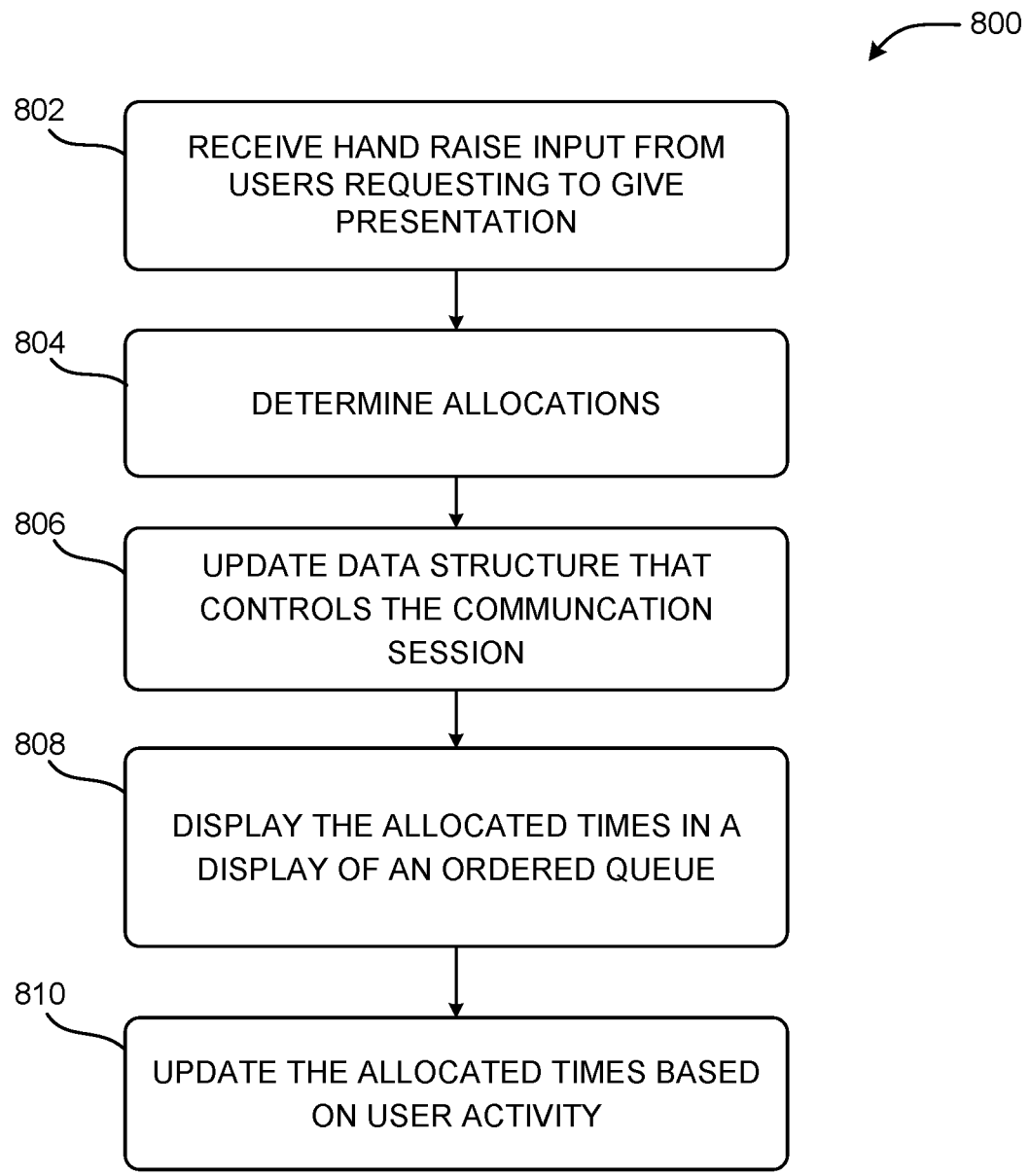
FIG. 3 is a flow diagram showing aspects of a routine for providing an automated transition between two different presenters of a communication session providing an automated transition between two different presenters of a communication session.

FIG. 3 is a diagram illustrating aspects of a routine 800 for providing automated transitions between presenters of a communication session. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 3 and the other FIGURES can be implemented in association with the example presentation user interfaces UI described above. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 800 includes an operation 802 where the system receives a hand raise input from users requesting permissions to communicate content, e.g., provide a presentation. In some configurations, operation 802 involves receiving one or more inputs associated with individual participants, such as Users 10G, 10H, 10L, 10J, 10F, who are each part of the communication session 604. The one or more inputs cause the system to order the identifiers of each of the participants, such as Users 10G, 10H, 10L, 10J, 10F, in a queue 221.

The individual inputs of the one or more inputs correspond to each of the individual participants requesting initiation of an operational state change from a first class of operations to a second class of operations. For instance, when User 10G submits an input requesting initiation of an operational state change from a first class of operations to a second class of operations, this input can cause the display of a hand raise 202. This input also places User 10G in the queue, and when it is time for User 10G to communicate his or her presentation to other computers using the main stage, the queue causes the system to change the operational state change from the first class of operations, e.g., operations that restrict User 10G from presenting on the main stage, to a second class of operations, e.g., operations that cause User 10G to present content on the main stage. Examples of these operations are shown in FIG. 1B and FIG. 2, where the system can receive "hand raise" inputs causing users to be placed in a queue. Each hand raise defined as a request for a state change for each user, e.g., a state change that grants permissions to become a presenter.

At operation 804, the system determines individual time allocations for each of the participants in the queue 221. With reference to the example described above, the users in the queue include Users 10G, 10H, 10L, 10J, and 10F. The individual time allocations are each based on a number of the participants in the queue and a remaining time of the communication session. Each timer for each person is based on (1) an amount of remaining meeting time, and (2) a number of detected raised hand users. For instance, if two participants provide a hand raise input, e.g., 2 out of 15 total attendees of a meeting that has 10 minutes remaining, the system could allocate each person with 7.5 minutes of allocated presentation time. If a third participant provides a hand raise input before the first person in the queue starts their allocated time, the system would allocate 3.33 minutes to each person. Deviations for each person can be granted based on one or more factors, including but not limited to, historical data, company or team rankings or titles, and/or preferences provided by each user. A deviation can also be based on an amount of content that a person is sharing. For example, if a first user has a large spreadsheet to share and the other five presenters in the queue do not have an associate file to share, that person may receive a predetermined percentage increase, e.g., 5% more time, over the others in a queue.

At operation 806, the system updates session data 714 in response to the one or more inputs associated with individual participants, such as Users 10G, 10H, 10L, 10J, 10F. The session data 714 defines the order of the identifiers of each of the participants. The order of the queue can be based on one or more factors. The first user in the queue can be a person having a higher rank in an organization, a person who provided their input before the other users, or the first user can be selected based on their historical data. For example, if historical records show that the first user has less overall presentation time, e.g., presenting in the main stage to other users, versus a second user, the first user may be selected to be the first presenter in the queue. Such features help even presentation time between team members. The session data can also define the individual time allocations for each of the participants. For instance, with Users 10G, 10H, 10L, 10J, and 10F in the queue, each person may be allocated 3 minutes of presentation time. These allocations can be stored in the session data.

At operation 808, the system can cause a display of a user interface 101 comprising the individual time allocations 203 for each of the participants, such as Users 10G, 10H, 10L, 10J, and 10F in the queue. The individual time allocations are displayed in association with respective identifiers or representative images of each of the participants 10G, 10H,

10L, 10J, 10F in the queue 221. For instance, the arrangement of the first identifier for User 10G can be horizontally aligned with the time allocated to User 10G. FIG. 1C shows an example of a display of the allocated times with associated names and images of people in the queue.

At operation 810, the system can update the allocations based on user activity. This can involve activity such as new users providing a hand raise input, existing users in the queue dropping from the queue, users finishing a presentation before their allocated time has lapsed, etc. For instance, the system can receive a supplemental input indicating an updated number of participants in the queue, wherein the updated number of participants in the queue is based on a number of new inputs from new participants in the queue requesting initiation of the operational state change from the first class of operations to the second class of operations, or a number of participants to be removed from the queue in response to a cancellation input to revoke a previous request to initiate the operational state change. The system can then determine one or more updated time allocations for individual participants remaining in the queue, wherein the one or more updated time allocations are each based on a number of the participants remaining in the queue and a new remaining time that is based on a time of the supplemental input and a scheduled end time of the communication session. The system can then update the display of the user interface to include the one or more updated time allocations for each of the participants remaining in the queue, wherein the one or more updated time allocations are displayed in association with the respective identifiers or the representative images of each of the remaining participants. This allows the displayed timers to dynamically adjust based on a new number of raised hand users, e.g., by new users providing a hand raise input or some lowering their hands, e.g., deactivating or cancelling a hand raise input.

In another example of operation 810, the system can re-allocate time in a biased manner based on historical activity, e.g., people who have talked more in the past receive less of the new time allocated from the user leaving the queue. The one or more updated time allocations for each of the participants remaining in the queue are weighted based on historical data indicating a time in which a participant has presented content. For example, a first participant of the participants remaining in the queue receives an increased allocation and a second participant of the participants receives a decreased allocation, wherein the historical data indicates that the first participant has a history of having less presentation time being displayed in the main stage than the second participant.

In yet another example of operation 810, the amount of time on timers are dynamically adjusted based on an update of unused meeting time after a raised hand user "finished." For example, the system can receive an update to a status of the communication session indicating that a participant has completed a presentation or has terminated a broadcast of a video stream or an audio stream during a time allocated for the participant. The system can then determine one or more updated time allocations for individual participants remaining in the queue, wherein the one or more updated time allocations include the individual time allocations for each of the participants remaining in the queue in addition of a remaining time of the time allocated for the participant, wherein the remaining time of the time allocated for the participant is divided between the individual participants remaining in the queue. The system can then update the display of the user interface to include the one or more updated time allocations for each of the participants remaining in the queue, wherein the one or more updated time allocations are displayed in association with the respective identifiers or the representative images of each of the remaining participants. This re-allocated time can be weighted based on historical activity, people who have talked more in the past receive less of the new time. For example, the one or more updated time allocations for each of the participants remaining in the queue are weighted based on historical data indicating a time in which a participant has presented content. A first participant of the participants remaining in the queue receives an increased allocation of the remaining time of the time allocated for the participant and a second participant of the participants receives a decreased allocation of the remaining time of the time allocated for the participant. The historical data can indicate that the first participant has a history of having less presentation time being displayed in the main stage than the second participant.

Similar to the re-allocated time based on changes to the queue, the original allocations can also be weighted based on prior activity, allocation is increased or decreased based on prior speaking contributions. For example, the individual time allocations for each of the participants in the queue are weighted based on historical data indicating a time in which a participant has presented content, wherein a first participant of the participants receives an increased allocation and a second participant of the participants receives a decreased allocation. The historical data indicates that the first participant has a history of having less presentation time being displayed in the main stage than the second participant.

The original time allocation can also be weighted based on a level or title in an organization. For example, the individual time allocations for each of the participants in the queue are weighted based on organizational data indicating a ranking or title of the participants. A first participant of the participants receives an increased allocation and a second participant of the participants receives a decreased allocation, wherein the organizational data indicates that a ranking or title of the first participant exceeds a ranking or title of the second participant.

The technical effects of the routine and other aspects disclosed herein include reducing the amount of bandwidth and computational cycles used by computing systems that provide a communication session for users. This is achieved by the use of the management of the permissions, the automation of the UI, and the Together Mode features that provide more cohesion to a user group, which leads to improved interaction between each person and their respective computers. Further, by providing controlled user interface transitions and permission transitions, a system can improve user engagement and reduce user fatigue. This can improve the efficacy of a meeting by allowing users to and avoid the need for additional meetings to discuss missed information, emails requesting missed information, a need for a playback of a recording of a meeting, etc. As a result, the disclosed systems and methods can significantly reduce the use of memory, computing cycles, and bandwidth utilization.

Figure 4:
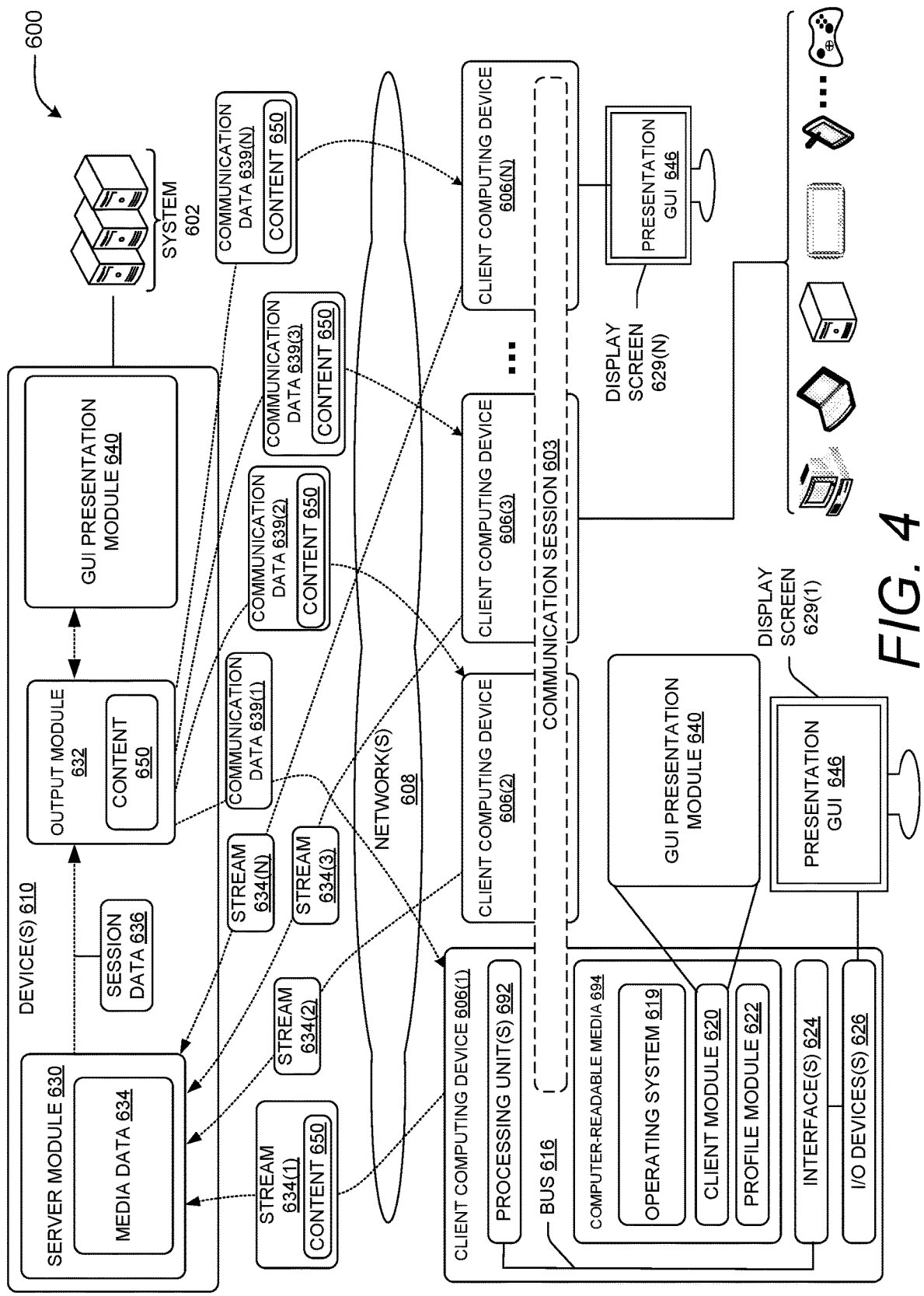
FIG. 4 is a computer architecture diagram illustrating an illustrative computer hardware and software architecture for a computing system capable of implementing aspects of the techniques and technologies presented herein.

FIG. 4 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 603. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations. A communication session 603 can include a start time and an end time, which can determine when video streams and live audio can be shared. Text and content can be shared outside of the start time and end time.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 4 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 4 illustrates that client computing device 606(1) is in some way connected to a display device (e.g., a display screen 629(N)), which can display a UI according to the techniques described herein.

In the example environment 600 of FIG. 4, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 4) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 4, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 5:
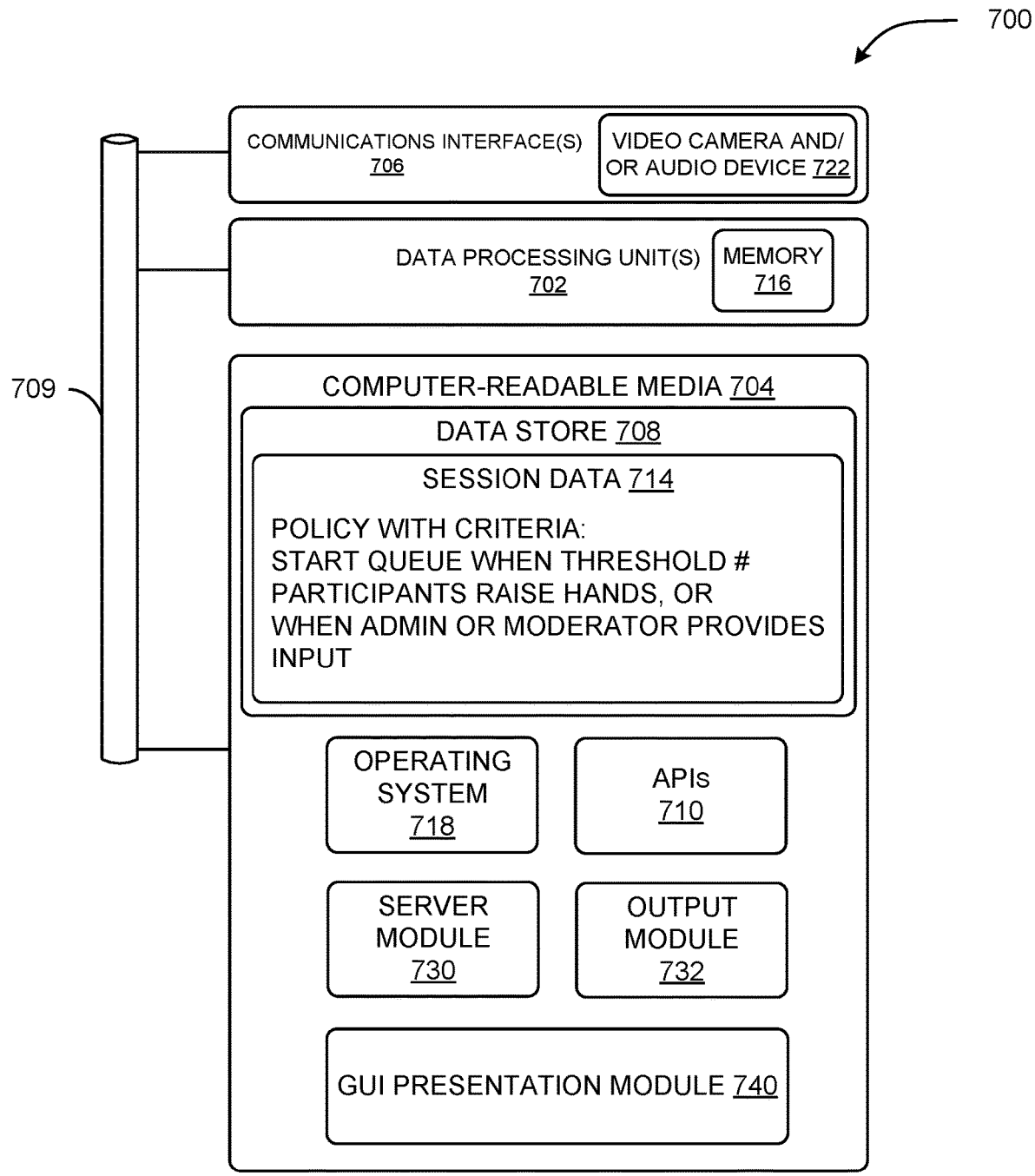
FIG. 5 is a computer architecture diagram illustrating a computing device architecture for a computing device capable of implementing aspects of the techniques and technologies presented herein.

FIG. 5 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data (e.g., session data 636 as shown in FIG. 4), profile data (e.g., associated with a participant profile), and/or other data. The session data can include a total number of participants (e.g., users and/or client computing devices) in a communication session, activity that occurs in the communication session, a list of invitees to the communication session, and/or other data related to when and how the communication session is conducted or hosted.

The data store 708 may also include session data 714 to store policies and other information regarding a queue. The session data 714 can define any type of activity or status related to the individual users 10A-10F each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment. A person's level can be used by the system to determine if that person can receive updated rights or if that person can approve rights of another person that has requested to spend more time as a presenter beyond their allocation.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method for controlling participation of individual attendees of a communication session, the method for execution on a system, the method comprising:
   detecting an input device state change at one or more input devices in communication with individual computing devices associated with individual participants of the communication session, the device state change causing the system to update a queue that arranges identifiers of each of the individual participants, wherein the input device state change corresponds to an individual participant of the individual participants, the input device state change causing an operational state change from a first class of operations to a second class of operations;
   in response to detecting the input device state change causing the operational state change from the first class of operations to the second class of operations;
   updating an original number of participants in the queue to a current number of participants, where the original number is increased or decreased to determine the current number of participants based on the input indicating the user request to change the status,
   determining, at the system, individual time allocations for each of the participants in the queue, wherein the individual time allocations are each based on the current number of participants in the queue and a remaining time of the communication session, wherein the individual time allocations for each of the participants in the queue is automatically updated without requiring a manual entry of updated individual time allocations for each of the participants in the queue, and
   updating, at the system, session data in response to the input device state change, the session data defining an order of the identifiers of each of the participants in the queue, the session data further defining the individual time allocations for each of the participants in the queue;
   causing a display of a user interface comprising the individual time allocations for each of the participants in the queue, wherein the individual time allocations are displayed in association with respective identifiers or representative images of each of the participants in the queue; and
   modifying one or more permissions for each of the participants in the queue based on the individual time allocations for each of the participants, wherein the one or more permissions control one or more audio, video, or presentation settings for each participant.

2. The method of claim 1, wherein the method further comprises:
   receiving a supplemental input indicating an updated number of participants in the queue, wherein the updated number of participants in the queue is based on a number of new inputs from new participants in the queue requesting initiation of the operational state change from the first class of operations to the second class of operations, or a number of participants to be removed from the queue in response to a cancellation input to revoke a previous request to initiate the operational state change;
   determine one or more updated time allocations for individual participants remaining in the queue, wherein the one or more updated time allocations are each based on a number of the participants remaining in the queue and a new remaining time that is based on a time of the supplemental input and a scheduled end time of the communication session; and
   updating the display of the user interface to include the one or more updated time allocations for each of the participants remaining in the queue, wherein the one or more updated time allocations are displayed in association with the respective identifiers or the representative images of each of the remaining participants.

3. The method of claim 2, wherein the one or more updated time allocations for each of the participants remaining in the queue are weighted based on historical data indicating a time in which a participant has presented content, wherein a first participant of the participants remaining in the queue receives an increased allocation and a second participant of the participants receives a decreased allocation, wherein the historical data indicates that the first participant has a history of having less presentation time being displayed in the main stage than the second participant.

4. The method of claim 1, wherein the wherein the method further comprises:
   receiving an update to a status of the communication session indicating that a participant has completed a presentation or has terminated a broadcast of a video stream or an audio stream during a time allocated for the participant;
   determine one or more updated time allocations for individual participants remaining in the queue, wherein the one or more updated time allocations include the individual time allocations for each of the participants remaining in the queue in addition of a remaining time of the time allocated for the participant, wherein the remaining time of the time allocated for the participant is divided between the individual participants remaining in the queue; and
   updating the display of the user interface to include the one or more updated time allocations for each of the participants remaining in the queue, wherein the one or more updated time allocations are displayed in association with the respective identifiers or the representative images of each of the remaining participants.

5. The method of claim 4, wherein the one or more updated time allocations for each of the participants remaining in the queue are weighted based on historical data indicating a time in which a participant has presented content, wherein a first participant of the participants remaining in the queue receives an increased allocation of the remaining time of the time allocated for the participant and a second participant of the participants receives a decreased allocation of the remaining time of the time allocated for the participant, wherein the historical data indicates that the first participant has a history of having less presentation time being displayed in the main stage than the second participant.

6. The method of claim 1, wherein the individual time allocations for each of the participants in the queue are weighted based on historical data indicating a time in which a participant has presented content, wherein a first participant of the participants receives an increased allocation and a second participant of the participants receives a decreased allocation, wherein the historical data indicates that the first participant has a history of having less presentation time being displayed in the main stage than the second participant.

7. The method of claim 1, wherein the individual time allocations for each of the participants in the queue are weighted based on organizational data indicating a ranking or title of the participants, wherein a first participant of the participants receives an increased allocation and a second participant of the participants receives a decreased allocation, wherein the organizational data indicates that a ranking or title of the first participant exceeds a ranking or title of the second participant.

8. The method of claim 1, wherein the system automatically grants each of the participants exclusive rights to broadcast a video stream and an audio stream during the individual time allocations for each participant in the queue, wherein the queue defines an order in which each participant exclusively broadcasts their video stream and audio stream to other participants of the communication session.

9. The method of claim 1, wherein the queue displays a visual time allocation of each of the participants in the queue, wherein the visual time allocation is determined in response to detecting the input device state change.

10. The method of claim 1, wherein the individual time allocations for each of the participants in the queue is not automatically updated when the input device state change is not detected, wherein the individual time allocations for each of the participants in the queue are updated in response to the update from the original number of participants in the queue to the current number of participants in the queue.

11. The method of claim 1, wherein the individual time allocation is determined in response to the input device state change, wherein the input device state change indicates a request to change a status in the queue, wherein the request to change a status in the queue includes at least one of: an action of joining the queue, an action of leaving the queue, or a completion of a presentation prior to an expiration of an allocated time.

12. The method of claim 1, wherein the one or more permissions cause a microphone for an individual participant to be unmuted during an allocated time for the individual participant, and wherein the one or more permissions cause the microphone for the individual participant to be muted during times other than the allocated time for the individual participant.

13. The method of claim 1, wherein the one or more permissions enable an individual participant to share at least one of a live video stream, a live audio stream, or shared content during an allocated time for the individual participant, and wherein the one or more permissions restrict the individual participant from sharing the live video stream, the live audio stream, or the shared content during times other than the allocated time for the individual participant.

14. The method of claim 1, wherein the one or more permissions are updated without requiring the manual entry of updated individual time allocations for each of the participants in the queue.

15. A computing device for controlling participation of individual attendees of a communication session, the computing device comprising:

one or more processing units; and
a computer-readable storage medium having encoded thereon computer-executable instructions to cause the one or more processing units to:
detect an input device state change at one or more devices in communication with individual computing devices associated with individual participants of the communication session, the device state change causing the system to order the identifiers of each of the participants in a queue, wherein the input device state change corresponds to an individual participant of the individual participants, the input device state change causing an operational state change from a first class of operations to a second class of operations;
in response to detecting the input device state change cause the operational state change from the first class of operations to the second class of operations:
update an original number of participants in the queue to a current number of participants, where the original number is increased or decreased to determine the current number of participants based on the input indicating the user request to change the status,
determine, at the system, individual time allocations for each of the participants in the queue, wherein the individual time allocations are each based on the current number of participants in the queue and a remaining time of the communication session, wherein the individual time allocations for each of the participants in the queue is automatically updated without requiring a manual entry of updated individual time allocations for each of the participants in the queue, and
update, at the system, session data in response to the input device state change, the session data defining the order of the identifiers of each of the participants in the queue, the session data further defining the individual time allocations for each of the participants in the queue;
cause a display of a user interface comprising the individual time allocations for each of the participants in the queue, wherein the individual time allocations are displayed in association with respective identifiers or representative images of each of the participants in the queue; and
modify one or more permissions for each of the participants in the queue based on the individual time allocations for each of the participants, wherein the one or more permissions control one or more audio, video or presentation settings for each participant.

16. The computing device of claim 15, wherein the individual time allocations for each of the participants in the queue are weighted based on historical data indicating a time in which a participant has presented content, wherein a first participant of the participants receives an increased allocation and a second participant of the participants receives a decreased allocation, wherein the historical data indicates that the first participant has a history of having less presentation time being displayed in the main stage than the second participant.

17. A computer-readable storage medium having encoded thereon computer-executable instructions to cause one or more processing units of a system for controlling participation of individual attendees of a communication session, the instructions cause the one or more processing units of the system to:
detect an input device state change at one or more input devices in communication with individual computing devices associated with individual participants of the communication session, the device state change causing the system to order the identifiers of each of the participants in a queue, wherein the input device state change corresponds to each an individual participant of the individual participants, the input device state change causing an operational state change from a first class of operations to a second class of operations;

in response to detecting the input device state change causing the operational state change from the first class of operations to the second class of operations:

updating an original number of participants in the queue to a current number of participants, where the original number is increased or decreased to determine the current number of participants based on the input indicating the user request to change the status, determine, at the system, individual time allocations for each of the participants in the queue, wherein the individual time allocations are each based on the current number of participants in the queue and a remaining time of the communication session, wherein the individual time allocations for each of the participants in the queue is automatically updated without requiring a manual entry of updated individual time allocations for each of the participants in the queue, and update, at the system, session data in response to the input device state change, the session data defining the order of the identifiers of each of the participants in the queue, the session data further defining the individual time allocations for each of the participants in the queue;

cause a display of a user interface comprising the individual time allocations for each of the participants in the queue, wherein the individual time allocations are displayed in association with respective identifiers or representative images of each of the participants in the queue; and modify one or more permissions for each of the participants in the queue based on the individual time allocations for each of the participants, wherein the one or more permissions control one or more audio, video, or presentation settings for each participant.

18. The computer-readable storage medium of claim 17, wherein the instructions further cause the one or more processing units to:

receive a supplemental input indicating an updated number of participants in the queue, wherein the updated number of participants in the queue is based on a number of new inputs from new participants in the queue requesting initiation of the operational state change from the first class of operations to the second class of operations, or a number of participants to be removed from the queue in response to a cancellation input to revoke a previous request to initiate the operational state change;

determine one or more updated time allocations for individual participants remaining in the queue, wherein the one or more updated time allocations are each based on a number of the participants remaining in the queue and a new remaining time that is based on a time of the supplemental input and a scheduled end time of the communication session; and update the display of the user interface to include the one or more updated time allocations for each of the participants remaining in the queue, wherein the one or more updated time allocations are displayed in association with the respective identifiers or the representative images of each of the remaining participants.

19. The computer-readable storage medium of claim 18, wherein the one or more updated time allocations for each of the participants remaining in the queue are weighted based on historical data indicating a time in which a participant has presented content, wherein a first participant of the participants remaining in the queue receives an increased allocation and a second participant of the participants receives a decreased allocation, wherein the historical data indicates that the first participant has a history of having less presentation time being displayed in the main stage than the second participant.

20. The computer-readable storage medium of claim 17, wherein the individual time allocations for each of the participants in the queue are weighted based on historical data indicating a time in which a participant has presented content, wherein a first participant of the participants receives an increased allocation and a second participant of the participants receives a decreased allocation, wherein the historical data indicates that the first participant has a history of having less presentation time being displayed in the main stage than the second participant.

* * * * *